United States Patent
Halliday et al.

(10) Patent No.: US 9,618,636 B2
(45) Date of Patent: Apr. 11, 2017

(54) SEISMIC ACQUISITION USING PHASE-SHIFTED SWEEPS

(71) Applicant: WESTERNGECO L.L.C., Houston, TX (US)

(72) Inventors: David Fraser Halliday, Cherry Hinton (GB); Robert Montgomery Laws, Cambridge (GB)

(73) Assignee: WESTERNGECO L.L.C., Houston, TX (US)

( * ) Notice: Subject to any disclaimer, the term of this patent is extended or adjusted under 35 U.S.C. 154(b) by 460 days.

(21) Appl. No.: 14/209,556

(22) Filed: Mar. 13, 2014

(65) Prior Publication Data

US 2014/0278119 A1   Sep. 18, 2014

Related U.S. Application Data

(60) Provisional application No. 61/788,265, filed on Mar. 15, 2013.

(51) Int. Cl.
  *G01V 1/04* (2006.01)
  *G01V 1/00* (2006.01)
  *G01V 1/37* (2006.01)
  *G01V 1/38* (2006.01)

(52) U.S. Cl.
  CPC ............... *G01V 1/04* (2013.01); *G01V 1/005* (2013.01); *G01V 1/37* (2013.01); *G01V 1/38* (2013.01)

(58) Field of Classification Search
  CPC ........................................................ G01V 1/04
  USPC ........................................................ 702/17
  See application file for complete search history.

(56) References Cited

U.S. PATENT DOCUMENTS

| 4,715,020 A | 12/1987 | Landrum, Jr. |
| 4,918,668 A | 4/1990 | Sallas |
| 5,410,517 A | 4/1995 | Andersen |
| 6,028,818 A | 2/2000 | Jeffryes |
| 7,876,642 B2 | 1/2011 | Robertsson et al. |
| 2009/0168600 A1 | 7/2009 | Moore et al. |
| 2012/0033526 A1 | 2/2012 | Hegna et al. |
| 2012/0082000 A1 | 4/2012 | Perciot et al. |
| 2012/0314536 A1 | 12/2012 | Bagaini |
| 2014/0334257 A1* | 11/2014 | Laws .................. G01V 1/3861 367/15 |

FOREIGN PATENT DOCUMENTS

| AU | 2005202928 A1 | 7/2005 |
| WO | 2005017564 | 2/2005 |
| WO | 2013080128 | 6/2013 |

(Continued)

OTHER PUBLICATIONS

International Search Report and Written Opinion of PCT Application No. PCT/US2014/026956 (1S122703W0) dated Aug. 19, 2014: pp. 1-16.

(Continued)

*Primary Examiner* — Bryan Bui

(57) ABSTRACT

A technique includes towing at least one seismic source in connection with a survey of a structure; and operating the seismic source(s) to fire shots, where each shot is associated with a frequency sweep. The technique includes varying phases of the frequency sweeps from shot to shot according to a predetermined phase sequence to allow noise in an energy sensed by seismic sensors to be attenuated.

16 Claims, 14 Drawing Sheets

(56) References Cited

FOREIGN PATENT DOCUMENTS

WO 2013105062 7/2013

OTHER PUBLICATIONS

Parkes et al., "An acquisition system that extracts the earth response from seismic data," first break, Dec. 2011, vol. 29: pp. 81-87.
Robertsson et al., "Z015: Full-wavefield, Towed-marine Seismic Acquisition and Applications," 74th EAGE Conference & Exhibition, Jun. 2012: pp. 1-5.
EP Search Report issued in the related EP Application 14770181.7, dated Sep. 22, 2016 (3 pages).

* cited by examiner

SEISMIC ACQUISITION USING PHASE-SHIFTED SWEEPS

CROSS-REFERENCE TO RELATED APPLICATION

This application claims the benefit of U.S. Provisional Patent Application Ser. No. 61/788,265 filed Mar. 15, 2013, which is incorporated herein by reference in its entirety.

BACKGROUND

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy only one type of sensor, both hydrophones and geophones, and/or other suitable sensor types. A typical measurement acquired by a sensor contains desired signal content (a measured pressure or particle motion, for example) and an unwanted content (or "noise").

SUMMARY

The summary is provided to introduce a selection of concepts that are further described below in the detailed description. This summary is not intended to identify key or essential features of the claimed subject matter, nor is it intended to be used as an aid in limiting the scope of the claimed subject matter.

In accordance with an example implementation, a technique includes towing at least one seismic source in connection with a survey of a structure; and operating the seismic source(s) to fire shots, where each shot is associated with a frequency sweep. The technique includes varying phases of the frequency sweeps from shot to shot according to a predetermined phase sequence to allow noise in an energy sensed by seismic sensors to be attenuated.

In accordance with another example implementation, a technique includes receiving data acquired by sensors. The data represents energy sensed by the sensors resulting from source energy from at least one seismic source, which interacts with a structure. The seismic source(s) are operated to fire shots such that each shot is associated with a frequency sweep. The technique includes varying phases of the frequency sweeps from shot to shot according to a predetermined phase sequence; and processing information derived from the data by a processor-based machine in an application that relies on the attenuation of noise present in the energy sensed by the sensors.

In accordance with another example implementation, an apparatus includes an interface to receive data acquired by sensors. The data represents energy sensed by the sensors resulting from source energy from at least one seismic source interacting with a structure, and the seismic source(s) are operated to fire shots. Each shot is associated with a frequency sweep, and phases of the frequency sweeps vary from shot to shot according to a predetermined phase sequence. The apparatus includes a processor to process information derived from the data by a processor-based machine in an application that relies on attenuation of noise present in the energy sensed by the sensors.

In accordance with yet another example implementation, an article includes a non-transitory computer readable storage medium that stores instructions that when executed by a computer cause the computer to receive data acquired by sensors. The data represents energy sensed by the sensors resulting from source energy from at least one seismic source interacting with a structure. The seismic source(s) are operated to fire shots, each shot is associated with a frequency sweep, and the phases of the frequency sweeps varying from shot to shot according to a predetermined phase sequence. The instructions when executed by the computer cause the computer to process information derived from the data in an application that relies on attenuation of noise present in the energy sensed by the sensors.

Advantages and other features will become apparent from the following drawings, description and claims.

DETAILED DESCRIPTION

Systems and techniques are disclosed herein for purposes of enhancing the attenuation of noise from seismic data acquired in a towed survey of a geologic structure by varying the phases of seismic source frequency sweeps. As an example, the noise may be attributable to one or more seismic sources whose energies are being filtered out in a source separation process. As another example, the noise may be residual shot noise that is present in a given shot record and is attributable to one or more previous shots of the same seismic source.

As a more specific example, in accordance with example implementations that are disclosed herein, the seismic sources are towed marine sources; and more specifically, the seismic sources may be towed marine seismic vibrators. Each vibrator is constructed to be controlled to generate a sweep according to a corresponding source function (a function that controls the time profile and frequency distribution of the sweep). Although the sweep may be continuous in the time domain, the sweep may or may not contain all frequencies in the full seismic frequency range (a range between approximately 2 Hertz (Hz) to about 100 Hz). As examples, the sweep may contain frequencies that continuously span the full seismic frequency range; may contain a subset of the full seismic frequency range; or may contain discrete frequencies/frequency bands.

Although a towed marine seismic survey is described herein in example implementations, it is understood that the techniques and systems that are disclosed herein may likewise be applied to stationary marine seismic surveys (seabed or ocean bottom cable (OBC)-based surveys, for example). Moreover, the systems and techniques that are disclosed herein may apply to non-seismic imaging acquisition and processing systems. Thus, many implementations are contemplated, which are within the scope of the appended claims.

Figure 1A:
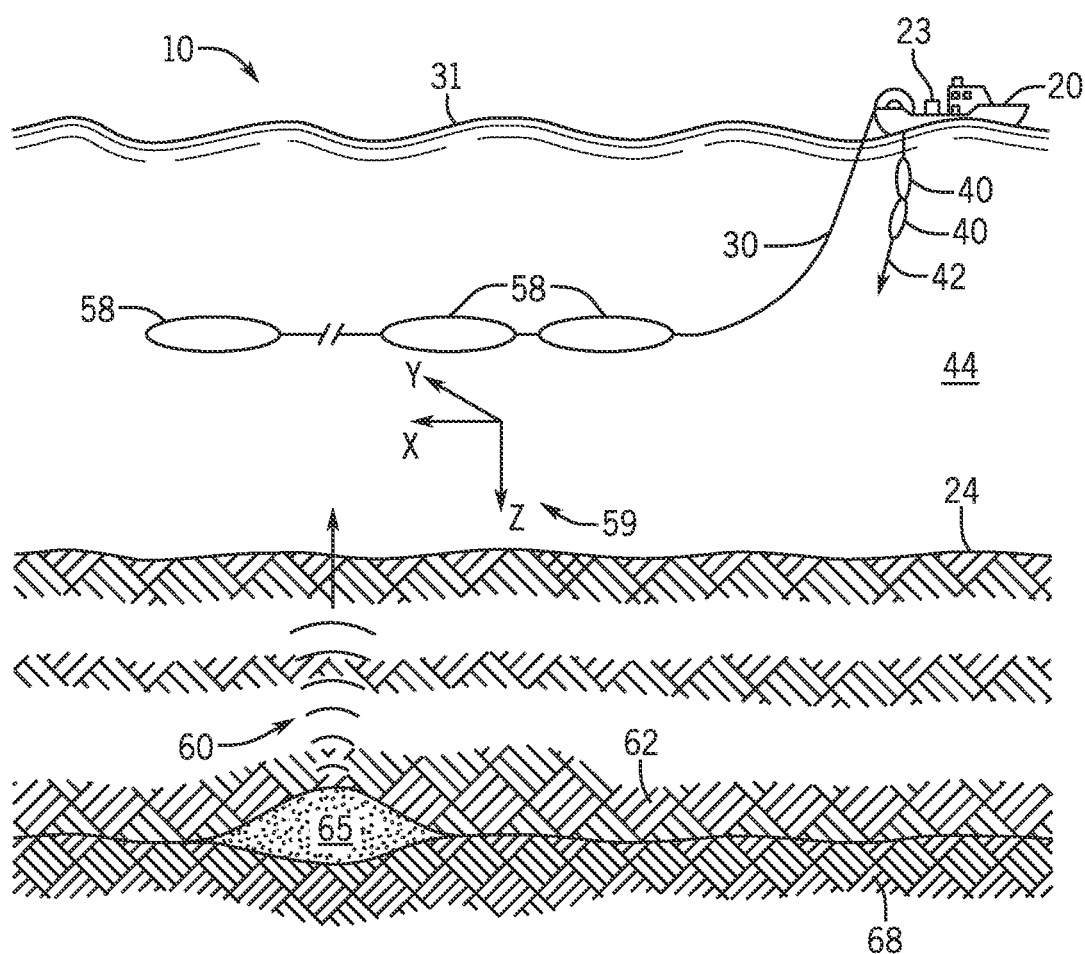
FIG. 1A is a schematic diagram of a seismic acquisition system according to an example implementation.

Referring to FIG. 1A, as an example of a towed survey, a marine-based seismic data acquisition system 10 includes a survey vessel 20, which tows one or more seismic streamers 30 (one exemplary streamer 30 being depicted in FIG. 1A) behind the vessel 20. It is noted that the streamers 30 may be arranged in an array, or spread, in which multiple streamers 30 are towed in approximately the same plane at the same depth. As another non-limiting example, the streamers may be towed at multiple depths, such as in an over/under spread, for example. Moreover, the streamers 30 of the spread may be towed in a coil acquisition configuration and/or at varying depths or slants, depending on the particular implementation.

A given streamer 30 may be several thousand meters long and may contain various support cables (not shown), as well as wiring and/or circuitry (not shown) that may be used to support communication along the streamer 30. In general, the streamer 30 includes a primary cable into which is mounted seismic sensors that record seismic signals. In accordance with example implementations, the streamer 30 contains seismic sensor units 58, each of which may contain a multi-component sensor. The multi-component sensor includes a hydrophone and particle motion sensors, in accordance with some example implementations.

Thus, each sensor unit 58 may be capable of detecting a pressure wavefield and possibly, one or more component of a particle motion that is associated with acoustic signals that are proximate to the sensor. Examples of particle motions include one or more components of a particle displacement, one or more components (inline (x), crossline (y) and vertical (z) components (see axes 59, for example)) of a particle velocity and one or more components of a particle acceleration.

Depending on the particular implementation, the multi-component sensor may include one or more hydrophones, geophones, particle displacement sensors, particle velocity sensors, accelerometers, pressure gradient sensors, or combinations thereof.

As a more specific example, in accordance with some implementations, a particular multi-component sensor may include a hydrophone for measuring pressure and three orthogonally-aligned accelerometers to measure three corresponding orthogonal components of particle velocity and/or acceleration near the sensor. It is noted that the multi-component sensor may be implemented as a single device (as depicted in FIG. 1A) or may be implemented as a plurality of devices, depending on the particular implementation. A particular multi-component sensor may also include pressure gradient sensors, which constitute another type of particle motion sensors. Each pressure gradient sensor measures the change in the pressure wavefield at a particular point with respect to a particular direction.

In addition to the streamers 30 and the survey vessel 20, the seismic data acquisition system 10 includes at least one seismic source 40, such as the two exemplary seismic sources 40 that are depicted in FIG. 1A. More specifically, the seismic sources 40 may be seismic vibrators that are constructed to generate energy according to sweep-based source functions, in accordance with example implementations. It is noted that, in accordance with example implementations, a group of seismic vibrators may form one of the sources 40 and as such, operate as a single seismic source.

In accordance with some example implementations, the seismic sources 40 may be coupled to, or towed by, the survey vessel 20. Alternatively, in other implementations, the seismic sources 40 may operate independently of the survey vessel 20, in that the sources 40 may be coupled to other vessels, buoys, autonomous operating vehicles, or may be in fixed positions, as just a few examples. In yet further implementations, multiple vessels may tow the seismic sources 40.

As the seismic streamers 30 are towed, the energies produced by the seismic sources 40 generate acoustic waves 42, which are directed down through a water column 44 into strata 62 and 68 beneath a water bottom surface 24. The acoustic waves 42 are reflected from the various subterranean geological formations, such as an exemplary formation 65 that is depicted in FIG. 1A.

The incident acoustic waves 42 produce corresponding reflected acoustic waves 60, which are sensed by the seismic sensors of the streamer(s) 30. It is noted that the acoustic waves that are received and sensed by the seismic sensors include "up going" pressure waves that propagate to the sensors without reflection, as well as "down going" pressure waves that are produced by reflections of the pressure waves 60 from an air-water boundary, or free surface 31.

Figure 6:
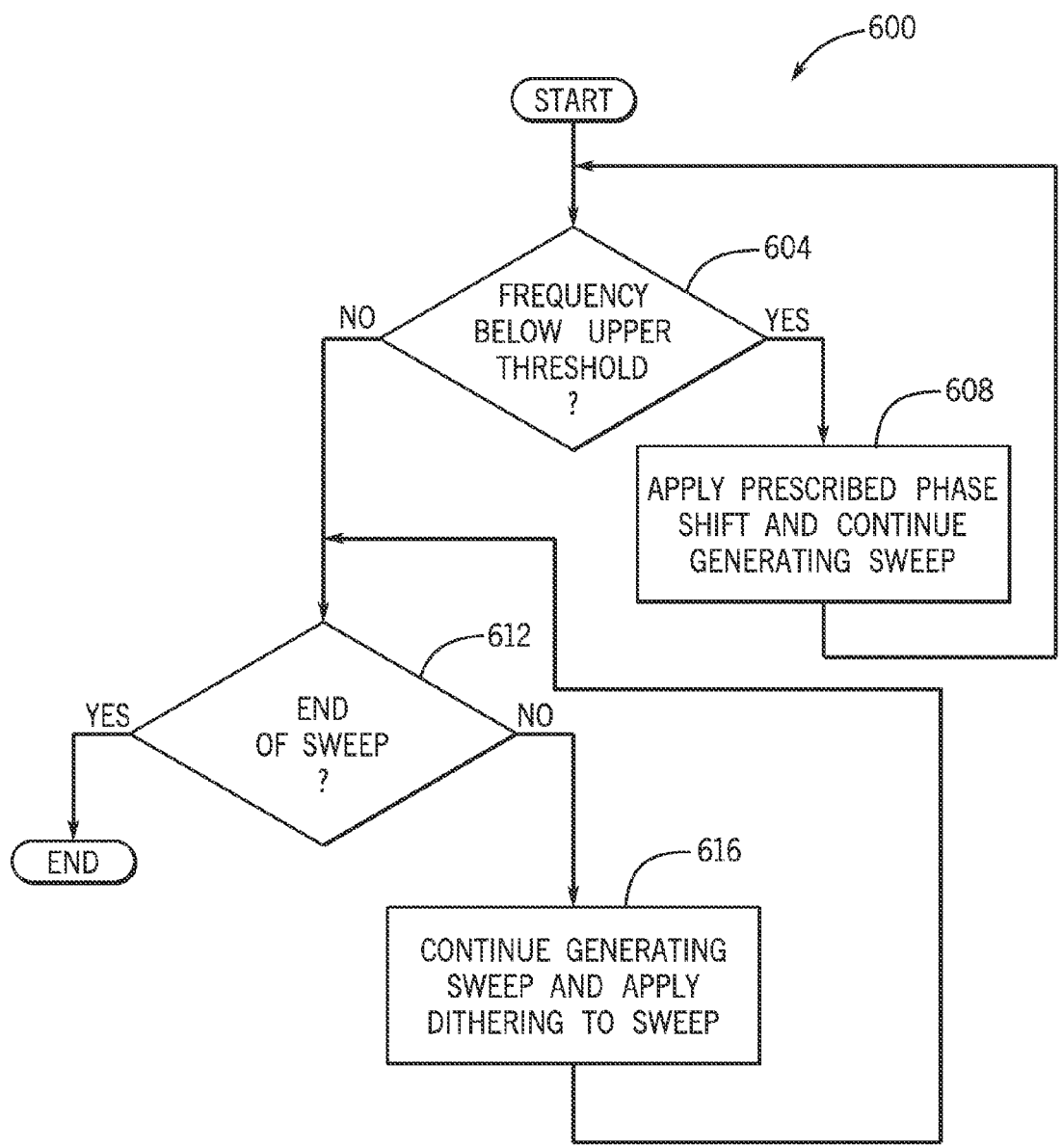
FIG. 6 is a flow diagram depicting a technique to operate seismic sources in a towed seismic survey according to an example implementation.

The seismic sensors of the streamers 30 generate signals (digital signals, for example), called "traces," which form the acquired measurements of the pressure wavefield and particle motion. The traces are recorded as seismic data and may be at least partially processed by a signal processing unit 23 that is deployed on the survey vessel 20, in accordance with some implementations and/or may be further processed, in general, by a local or remote data processing system 620 that is generally depicted in FIG. 6 and described below. As an example, a particular multi-component sensor may provide a trace, which corresponds to a measure of a pressure wavefield by its hydrophone; and the sensor may provide (depending on the particular implementation) one or more traces that correspond to one or more components of particle motion.

A goal of the seismic acquisition may be to build up an image of a survey area for purposes of identifying characteristics of subterranean geological formations, such as the example geological formation 65. Subsequent analysis of the representation may reveal probable locations of hydrocarbon deposits in subterranean geological formations. Moreover, the seismic data may be processed to determine characteristics of the geological formation 65, such as the parameters of an elastic model, fluid properties of the formation 65 and the lithology of the formation 65.

Figure 2:
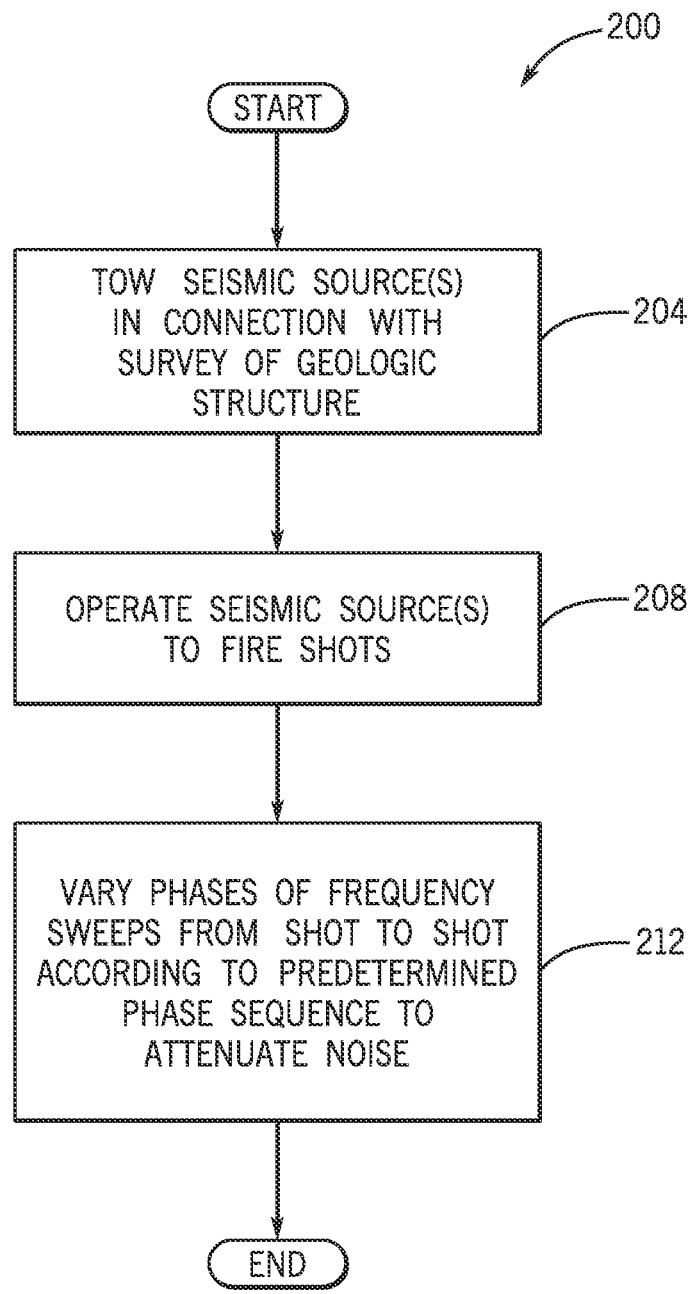
FIG. 2 is a flow diagram depicting a technique to conduct a towed seismic survey to attenuate noise according to an example implementation.

In accordance with example implementations that are disclosed herein, a technique 200 (see FIG. 2) includes towing one or more seismic sources in connection with the survey of a geologic structure, pursuant to block 204. The seismic source(s) may then be operated, pursuant to block 208 to fire successive shots. Phases of frequency sweeps of the source(s) may then be varied (block 212) from shot to shot according to a predetermined phase sequence for purposes of attenuating noise.

For a first example implementation that is disclosed herein, the "noise" refers to energy from one or more seismic sources, which is being filtered out in a source separation process. Thus, the "noise" for this example implementation refers to the energy attributable to the seismic source(s) other than the seismic source that is targeted as part of the source separation. In this manner, for reasons of efficiency, multiple seismic sources may be simultaneously or near simultaneously activated during a towed seismic survey, and in general, source separation refers to the processing of the acquired seismic data to separate the sensed energy according to the source. More specifically, in accordance with example implementations that are disclosed herein, simultaneously or near-simultaneously-activated seismic sources (vibrators, for example) generate frequency sweeps in respective shots. In other words, each shot of a seismic source is produced by varying the energy emitted by the seismic source according to an applied sweep function.

Although the sweep functions may otherwise be identical, the phase shifts of these sweep functions are varied from shot to shot according to a prescribed, non-random phase sequence. In accordance with example implementations, this non-random phase sequence is a sequence that would fail a conventional test of randomness (e.g., a pseudo-random sweep would pass such a test) and allows the energy from two given sources to be moved apart in some domain (the frequency-wavenumber domain, for example). This domain separation allows separation of the sensed energy according to the source that produces the sensed energy, i.e., allows source separation of the sensed energy. Moreover, as disclosed herein, the data acquired by the sensors may, depending on the particular implementation, be in the form in which the sensed energy is already source-separated or may be processed for purposes of performing source separation. Thus, many implementations are contemplated, which are within the scope of the appended claims and described in further detail below.

Figure 1B:
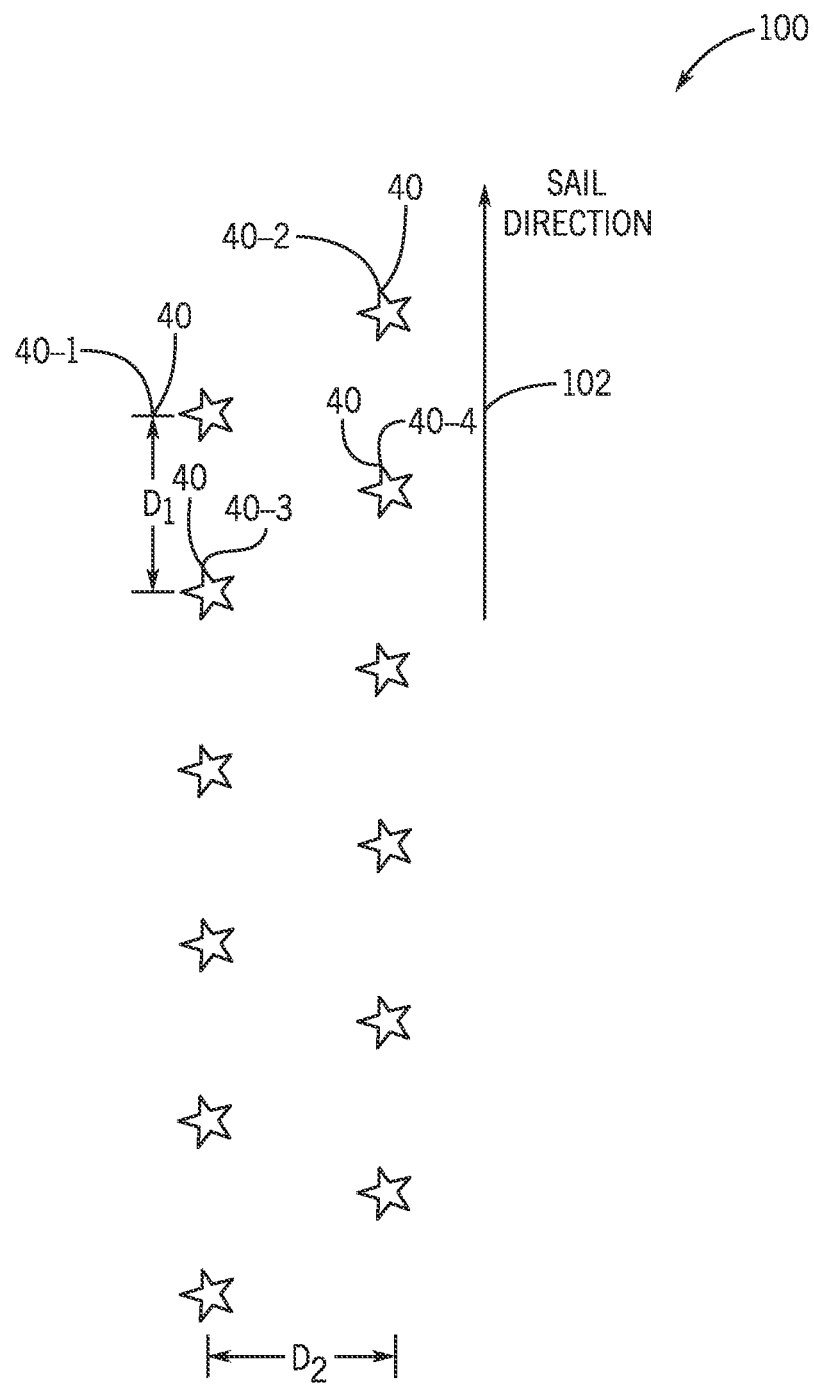
FIG. 1B is an illustration of a source array used in a towed seismic survey according to an example implementation.

In accordance with an example implementation, the seismic sources 40 may be towed in generally parallel paths in a given sail direction 100, as illustrated in FIG. 1B. Moreover, as an example, some or all of the seismic sources 40 may be fired at or near the same time (i.e., the respective sweeps may begin at or near the same time) according to a path alternating sequence. As depicted in FIG. 1B, for this example, the sources 40 are arranged so that the sources 40-1 and 40-3 are inline and spaced apart by a distance called "$D_1$;" the sources 40-2 and 40-4 are inline in a path that is a distance called "$D_2$" from the inline path of the sources 40-1 and 40-3 and are spaced apart by the $D_1$ distance; and the inline positions of the sources 40 are interleaved. As an example, the $D_1$ distance may be in a range of approximately five to ten meters, and the $D_2$ distance may be approximately 50 meters. Other $D_1$ and $D_2$ distances may be used, in accordance with further implementations.

In accordance with example implementations, the seismic sources 40 are seismic vibrators, in which the phase of the energy emitted by the vibrators may be controlled in detail. In particular, the seismic vibrators are simultaneously or near-simultaneously-activated in a series of phase shifted frequency sweeps to acquire and allow the subsequent source separation of the acquired seismic data. In this regard, as described above, the spacing of seismic vibrators may be relatively close.

In accordance with example implementations, the seismic vibrators are operated pursuant to a prescribed sequence that preserves phase relationships between the sweeps. This prescribed sequence is a non-random sequence of phases, that is, a sequence that would fail a conventional test of randomness (for example, a pseudo-random sequence would fail such a test). The sequence is designed such that it allows the energy from two or more simultaneously acquired sources to be moved apart in some domain (for example, the frequency-wavenumber domain). Moreover, the source energy is acquired with relatively the same spatial sampling interval (but not with the same sample positions). Small positioning errors may be acceptable if used to maintain the phase relationship from shot to shot. For example, this may be equivalent to two experiments being acquired simultaneously, with the only difference being that one source has a small fixed positional shift relative to the other.

As described further below, the phase shifted sweeps may be used to separate the acquired data from different shots in the frequency-wavenumber (f-k) domain up to a certain frequency limit or threshold, in accordance with example implementations. The upper frequency threshold of this separation may depend on a number of factors, such as the number of simultaneously-activated sources and the shot sampling interval. The data acquired by the seismic sensors may be separated using frequency-wavenumber filtering, in accordance with example implementations. However, as further described herein, the data may be separated using other techniques; and, in yet further example implementations, explicit processing to separate the energy may not be used. For example, the non-random sequences of phase could be designed such that, despite the sources being acquired simultaneously, the energy from each source only contributes towards the desired part of the seismic image. This separation through imaging is typically referred to as "passive separation" whereas the explicit separation of sources may be referred to as "active separation."

As also disclosed herein, the non-random phase controlled sweeps may be combined with a higher frequency phase or time dithered signal, such that after signature deconvolution, the data may appear to be dithered, allowing dither-based simultaneous source separation to be applied for those higher frequencies. For example, above the upper frequency threshold, the sweeps may not be shifted; but rather, the sweeps may be synchronized, except for the dithering. Therefore, dither-based simultaneous source separation may be applied to the acquired seismic data in this upper frequency bandwidth.

The techniques and systems that are disclosed herein may be used for purposes of the combination of sources for over-under source side deghosting; increasing the sampling of the seismic wavefield on the source side; or to acquire multiple survey lines simultaneously Turning now to specific example implementations, two seismic sources (called "$S_1$" and "$S_2$" herein), such as seismic vibrators, may be operated as follows. In general, the $S_1$ and $S_2$ sources may be towed behind a vessel with a small offset (an offset of five to ten meters, for example) between the sources. For this example, the sweeps of $S_1$ and $S_2$ sources begin at the same time. However, the relative phase shift between the sweeps for the $S_1$ and $S_2$ sources are varied according to a described, or predetermined, sequence. In this manner, each $S_1$, $S_2$ source for this example emits energy due to the application of the same sweep function being applied, with the exception of a predetermined phase shift.

For example, the S1 and $S_2$ sources may be fired according to the following sequence:
[$S_1$90+$S_2$0], [$S_1$0+$S_2$90], [$S_1$90+$S_2$0], [$S_1$0+$S_2$90], [$S_1$90+$S_2$0], Firing Sequence 1
where the commas delimit each set of simultaneous shots, and the suffix proceeding the $S_1$/$S_2$ source designation denotes the relative phase in degrees. For example, for the first set of simultaneous shots by the $S_1$ and $S_2$ sources in Firing Sequence 1, the $S_1$ source has a ninety degree phase shift with respect to the $S_2$ source.

To align the acquired data with the $S_1$ source, the resulting acquired sensor data may be deconvolved by the following phase operator:
90, 0, 90, 0, 90, Phase Operator 1
where the commas delimit each set of simultaneous shots. The deconvolution produces the following sequenced data:
[$S_1$0+$S_2$−90], [$S_1$0+$S_2$90], [$S_1$0+$S_2$−90], [$S_1$0+$S_2$90], [$S_1$0+$S_2$−90], . . . Deconvolved Data Seq. 1

This deconvolved data sequence is aligned with the S1 source. To align the signals from the $S_2$ source, the acquired sensor data may be deconvolved by the following phase operator:
0, 90, 0, 90, 0, . . . Phase Operator 2
This deconvolution produces the following data sequence:
[$S_1$90+$S_2$0], [$S_1$−90+$S_2$0], [$S_1$90+$S_2$0], [$S_1$−90+$S_2$0], [$S_1$90+$S_2$0], . . . Deconvolved Data Seq. 2

Thus, for the Deconvolved Data Sequence 1, the phase of the $S_1$ source is aligned with zero degrees; and the phase of the data corresponding to the $S_2$ source alternates at a 180 degree difference. The opposite is true for the Deconvolved Data Sequence 2, in which the $S_2$ source data is aligned, and the $S_1$ source data alternates by 180 degrees. The data for each set of two simultaneous shots may be separated after deconvolution using frequency-wavenumber filtering, as an example.

Figure 3:
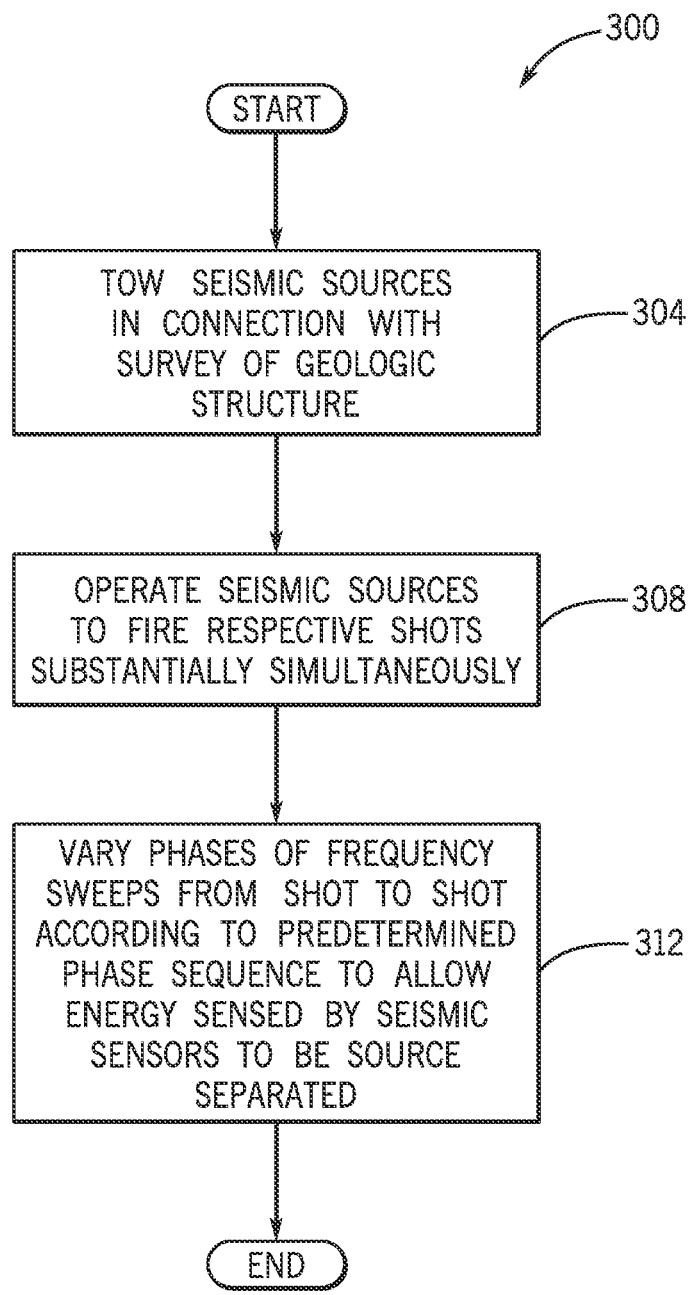
FIG. 3 is a flow diagram depicting a technique to conduct a towed seismic survey to enhance source separation according to an example implementation.

Thus, referring to FIG. 3, in accordance with example implementations, a technique 300 includes towing (block 304) seismic sources in connection with a survey of a geologic structure. According to the technique 300, the seismic sources are operated (block 308) to fire respective shots substantially simultaneously/near simultaneously. The phases of frequency sweeps from shot to shot are varied (block 312) according to a predetermined phase sequence to allow energy sensed by seismic sensors to be source separated.

Figure 4:
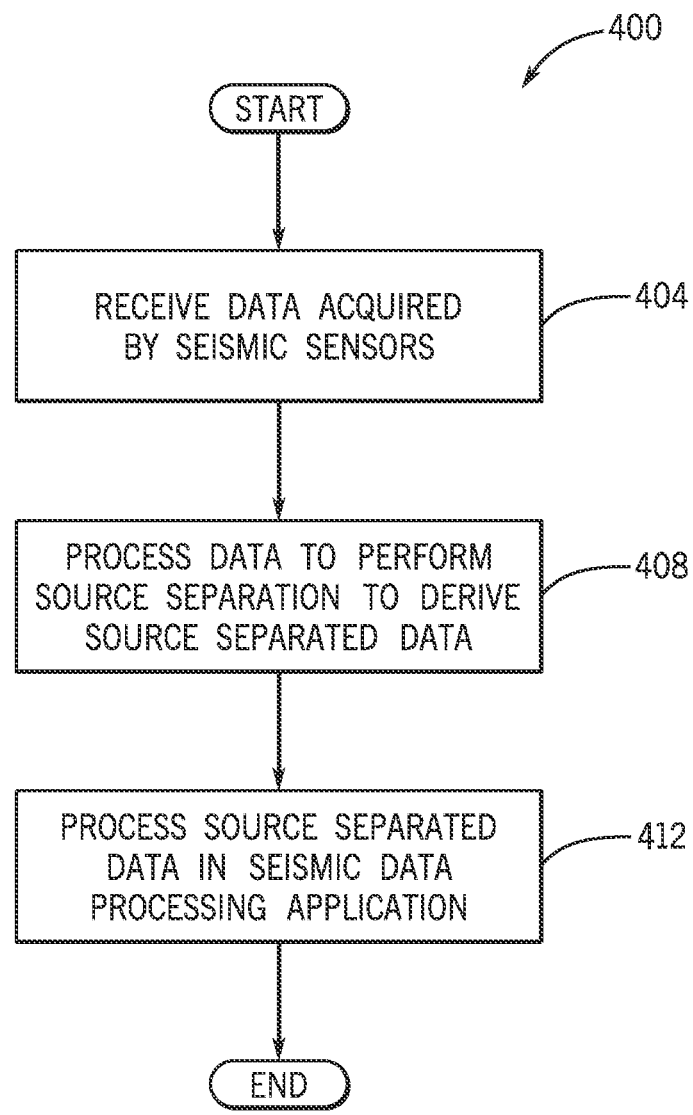
FIGS. 4 and 5 are flow diagrams depicting techniques to process data acquired in a towed seismic survey according to example implementations.

Moreover, pursuant to a technique 400 of FIG. 4, on the processing side, data acquired by seismic sensors may be received (block 404) and processed (block 408) to perform source separation to derive source separated data. This source separated data may then be processed (block 412) in a seismic data processing application.

Figure 5:
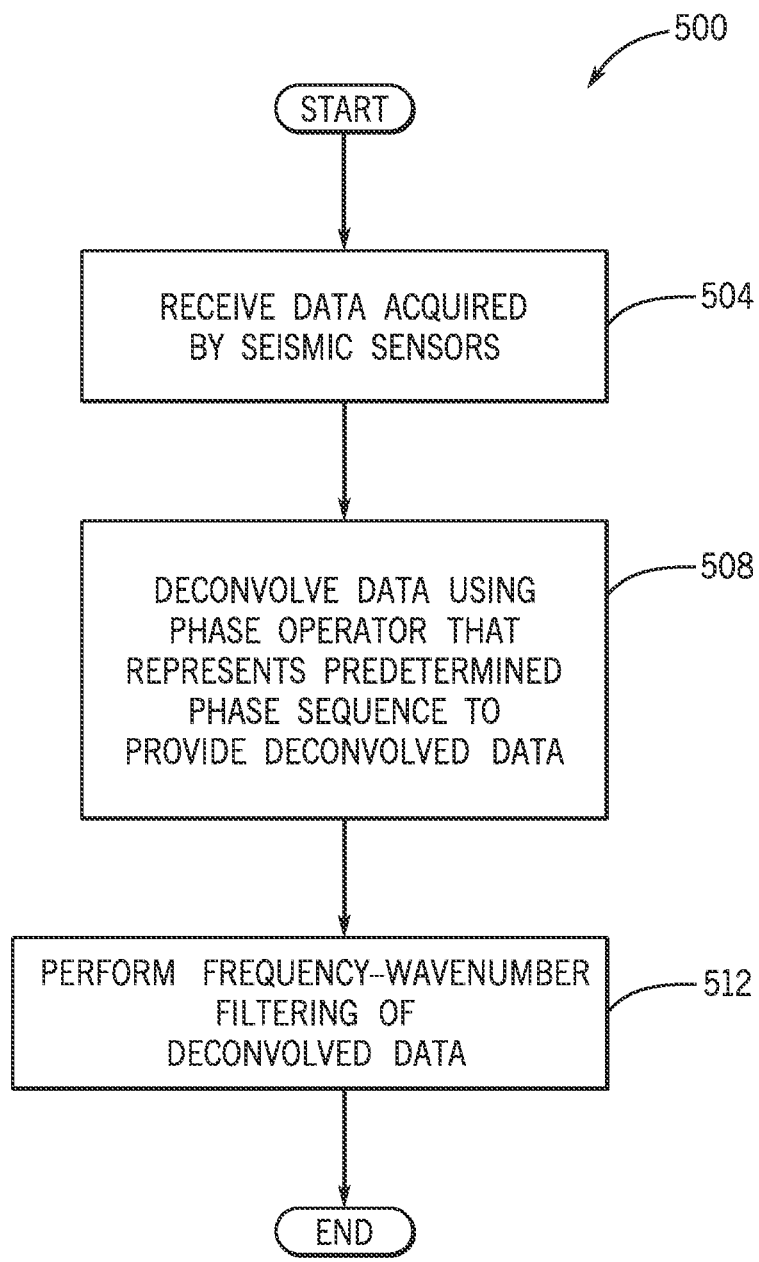

More specifically, pursuant to a technique 500 of FIG. 5, data may be received (block 504), which are required by seismic sensors. Pursuant to the technique 500, the data may be deconvolved (block 508) using a phase operator that represents a predetermined phase sequence for purposes of providing deconvolved data. Frequency-wavenumber filtering may then be performed, pursuant to block 512, of the deconvolved data for purposes of source separating the data.

As noted above, the use of the phase-shifted sweeps for source separation may be applicable up to a certain frequency threshold. Therefore, referring to FIG. 6, in accordance with example implementations, a technique 600 for operating a given seismic source may take this into account by using prescribed phase shifting up to a certain frequency threshold and then imparting another characteristic to the sweeps to enhance their separation from frequencies about the threshold. The technique 600 includes applying (block 608) a prescribed phase shift and generating a sweep until a determination is made (decision block 604) that the sweep frequency is above a certain frequency threshold. When this occurs, dithering may be applied to the sweep, pursuant to block 616 until a determination is made (decision block 612) that the end of the sweep has occurred (i.e., the end frequency for the sweep has been reached).

It is noted that in accordance with further example implementations, the predetermined phase sequences may be used for the full bandwidth, and thus, a different method may not be applied above a certain frequency threshold.

From the data processing side, in accordance with some implementations, a frequency-diverse technique may be used to separate the data for frequencies above the upper frequency threshold. In this manner, the additional information that is provided across multiple frequencies allows for separation at higher frequencies. As an example, the sweeps may be time dithered for higher frequencies so that the resulting acquired data may be separated pursuant to a technique described in PCT Publication No. WO2013/080128 A1, entitled, "SEPARATION OF SIMULTANEOUS SOURCE DATA," which published on Jun. 6, 2013. In this approach, time dithering is used to separate the data acquired from simultaneously or near-simultaneously activated seismic sources. In accordance with further example implementations, patterns of phase shifts may be dithered, or slightly varied, for purposes of adding additional information that may be used to perform source separations above the upper frequency threshold. Thus, many variations are contemplated, which are within the scope of the appended claims.

The above-described systems and techniques may be similarly applied to more than two sources that are operated simultaneously or near-simultaneously. In this manner, the use of more than two simultaneously or near-simultaneously activated sources decreases the frequency-wavenumber separation limit and as such, the techniques may become more reliant on the above-described technique for separation above the upper frequency threshold. However, low frequency data may be of more interest for certain geologic strategies, such as in some survey areas where the target for exploration is a sub-salt or sub-basalt reservoir. Therefore, such an acquisition scheme may benefit from the use of more than two simultaneously or near-simultaneously activated sources.

As a more specific example, for the case of three seismic sources (called "$S_1$," "$S_2$," and "$S_3$" below), the phases of the sweep may be adjusted so that two misaligned sources have phases that alternate by 120 and 240 degrees from shot to shot.

For example, the seismic sources may be fired according to the following firing sequence.
[$S_1$0+$S_2$−60+$S_3$60], [$S_1$180+$S_2$0+$S_3$0], [$S_1$0+$S_2$60+$S_3$−60], [$S_1$60+$S_2$0+$S_3$120], [$S_1$0+$S_2$−180+$S_3$180], [$S_1$300+$S_2$0+$S_3$240], . . . Firing Seq. 3
The deconvolved data sequences are then as follows:
[$S_1$0+$S_2$−60+$S_3$60], [$S_1$0+$S_2$−180+$S_3$−180], [S1 0+$S_2$60+$S_3$−60], [S1 0+$S_2$−60+$S_3$60], [S1 0+$S_2$−180+$S_3$180], [S1 0+$S_2$−300+$S_3$−60], . . . Deconvolved Data Seq. 3
[$S_1$60+$S_2$0+$S_3$120], [$S_1$180+$S_2$0+$S_3$0], [$S_1$−60+$S_2$0+$S_3$−120], [$S_1$60+$S_2$0+$S_3$120], [$S_1$180+$S_2$0+$S_3$360], [$S_1$300+$S_2$0+$S_3$240], . . . Deconvolved Data Seq. 4

$[S_1-60+S_2-120+S_30]$, $[S_1180+S_20+S_30]$, $[S_160+S_2120+S_30]$, $[S_1-60+S_2-120+S_30]$, $[S_1-180+S_2-360+S_30]$, $[S_160+S_2-240+S_30]$, . . . Deconvolved Data Seq. 5

As can be seen from the Deconvolved Data Sequence 3, the phase of the second and third shots varies as −120, 240, −120, −120, −120 and −240, 120, 120, 120, 240, respectively. For the deconvolved data sequence 4, the phase of the first and third shots varies as 120, −240, 120, 120, 120 and −120, −120, 240, 240, −120, respectively. For the Deconvolved Data Sequence 5, the phase of the first and second shots varies as 240, −120, −120, −120, 240 and 120, 120, −240, −240, 120, respectively.

If it is noted that a phase shift of −120 is equivalent to one of 240, and a phase shift of −240 is equivalent to one of 120, then it may be recognized that the Firing Sequence 3 has the desired properties.

It is noted that explicit source separation may not be performed in accordance with example implementations. In this manner, in accordance with some example implementations, the acquired data may be processed to perform deghosting and/or imaging applications without explicitly separating the simultaneous sources. In this case, the non-random phase sequence may be designed such that the simultaneous sources only contribute to the part of the image that they were intended to.

For other applications, particularly in the case of over-under sources, the wavefields may be combined prior to source separation and source separation may be performed afterwards. For example, a technique such as the one described in PARKES, G., AND HEGNA, S., 2011, "AN ACQUISITION SYSTEM THAT EXTRACTS THE EARTH RESPONSE FROM SEISMIC DATA, FIRST BREAK, VOL. 29, No. 12, pp. 81-87 may be used, where over-under sources are combined for deghosting prior to separation of the data (in this specific case, the deghosting operation itself separates the data).

In accordance with further example implementations, a predetermined phase sequence may be used to attenuate residual shot noise from one or more previous shots of the same seismic source. In particular, a relatively simple repeating pattern of phase shifts may be used that causes a residual shot noise to be heterodyned, or aliased, away from the signal in the frequency-wavenumber domain of a common receiver gather. In this manner, in the towed survey, the shots from a given seismic source are fired "on time," rather than "on position." Therefore, there is a relatively rigid timing synchronization between the shots of the given seismic source so that the phase relationships between the shots are not disturbed.

The techniques and systems that are disclosed herein may be used to allow the residual shot noise to be removed by applying frequency-wavenumber filtering (or other techniques) and does not rely on sacrificing spatial resolution. Moreover, as a result of the reduction of the residual shot noise, the typical length of time between successive shots may be shortened. In traditional seismic source control, the time between successive shots may be selected to be larger than desirable so the residual shot noise decays to a sufficiently small level in the current shot record. The techniques and systems that are disclosed herein, therefore, may reduce this time between successive shots.

More specifically, residual shot noise originates from a given seismic source that was used in a previous shot or shots. The shot interval typically is much longer than the two-way-time (TWT) to the imaging target for purposes of allowing the residual shot noise to decay to an acceptable level before the next shot is fired. Waiting for the residual shot noise to decay, however, may introduce several challenges. For example, the spatial shot interval may be inadequate (too large), and the vessel speed towing the seismic spread may be too slow. If a time is not used for the residual shot noise to decay before firing the next shot, a closer shot spacing may be used, leading to relatively improved seismic imaging. Alternatively, the shot spacing may be maintained while the vessel speed is increased, thereby leading to greater efficiency in the seismic acquisition.

Figure 7:
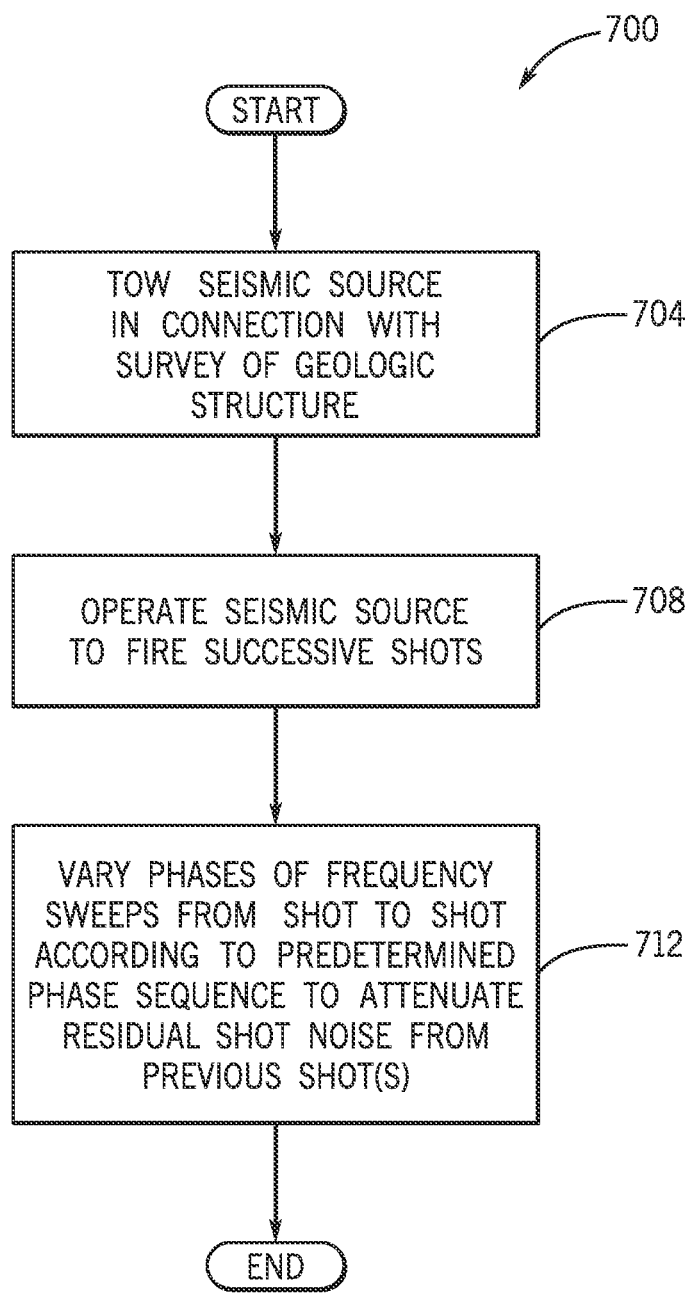
FIG. 7 is a flow diagram depicting a technique to attenuate residual shot noise according to an example implementation.

Thus, referring to FIG. 7, in accordance with example implementations, a technique 700 includes towing (block 704) a seismic source in connection with the survey of a geologic structure and operating (block 708) the seismic source to fire successive shots. Phases of frequency sweeps are varied (block 712) from shot to shot according to a predetermined phase sequence to attenuate residual shot noise from one or more previous shots.

Figure 8:
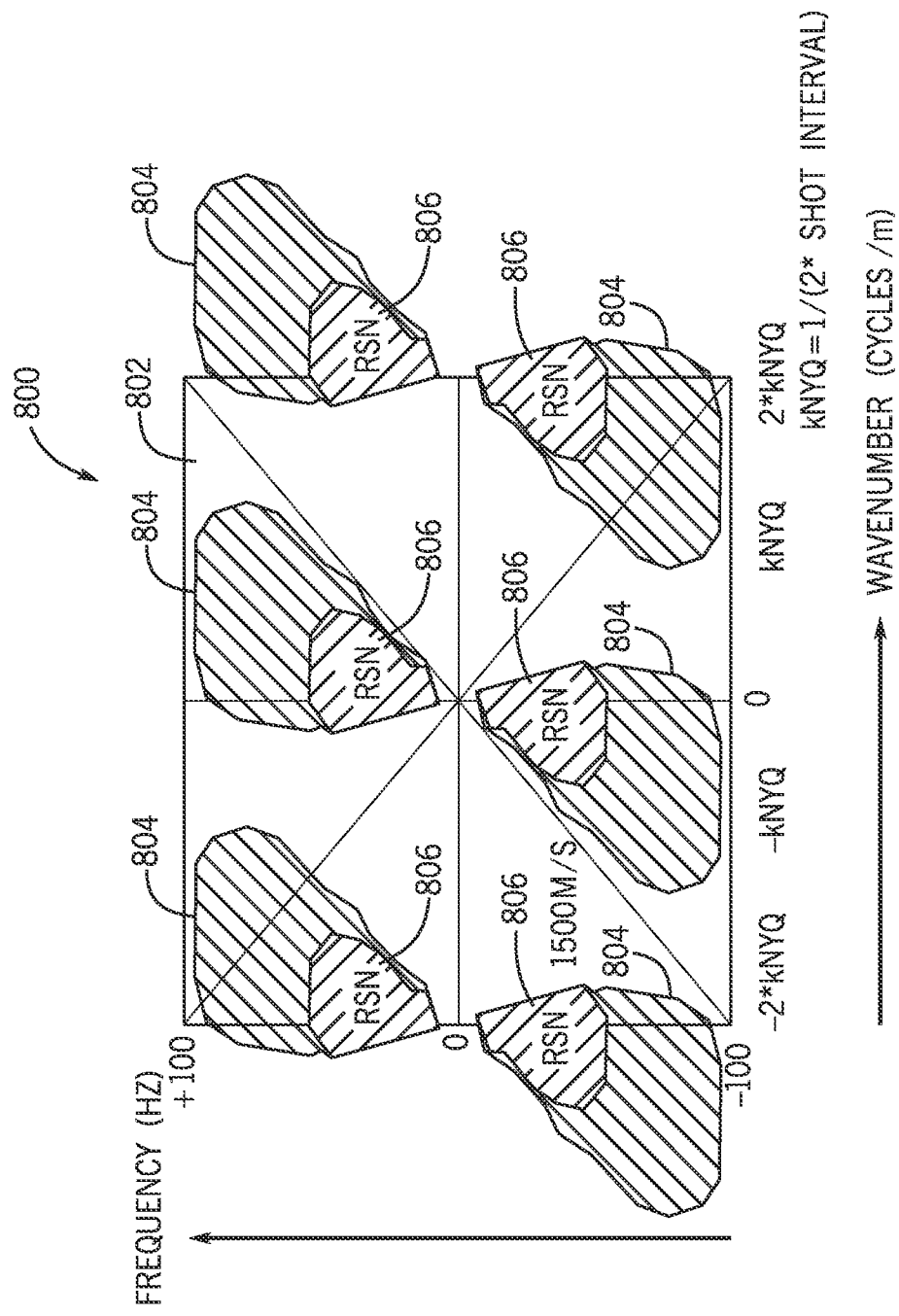
FIGS. 8 and 10 are frequency-wavenumber representations of seismic data acquired using shots from a seismic source having the same phase.

It is possible to use the same source signature for each shot, in accordance with example implementations. In general, the residual shot noise lies in the same place as the signal in the frequency-wavenumber common receiver domain, and the residual shot noise typically has a lower amplitude than the seismic signal and is predominantly low frequency. Because the residual shot noise and the seismic signal occupy the same frequency-wavenumber space, it may be challenging to separate the signal from the residual shot noise. More specifically, FIG. 8 depicts an illustration 800 of acquired energy in the frequency-wavenumber domain when the same phase is used from shot to shot. As depicted in FIG. 8, for a given signal cone 802, signal energy 804 generally is present in the same frequency-wavenumber space as residual shot noise 806, i.e., shot noise from the previous shot for this example. Due to the co-location of the residual shot noise energy 806 and signal energy 804, it may be particularly challenging to separate the signal energy 804 from the residual shot noise 806.

In accordance with example implementations, the seismic source is fired according to a predetermined phase sequence for purposes of separating residual shot noise energy from the signal energy. If a positive 90 degree phase shift is applied to the source signal of alternative shots from the same seismic source, the shots from the source may be represented in phases as follows:

+90, 0, +90, 0, +90, 0. . . Firing Seq. 4.

The residual shot noise, with this sequence, has the phase from the previous shot and has corresponding phases from the following shots, as described below:

0, +90,0, +90, 0, +90. . . Residual Shot Noise Seq. 1.

Each shot (and the residual shot noise from the previous shot) may then be deconvolved using the shot's phase. The applied deconvolution operator has phases, which are the inverse of the signal phases, as represented below:

−90, 0, −90, 0. . . Deconvolution Operator Phases 1.

After deconvolution, the signal, as expected, has zero phase shift for all shots, as represented below:

0, 0, 0, 0, 0, 0, 0. . . Deconvolved Data Seq. 6.

But after deconvolution, the residual shot noise has alternate negative and positive 90 degree phases, as represented below:

−90, +90, −90, +90, −90, +90. . . Residual Shot Noise Seq. 2.

Figure 9:
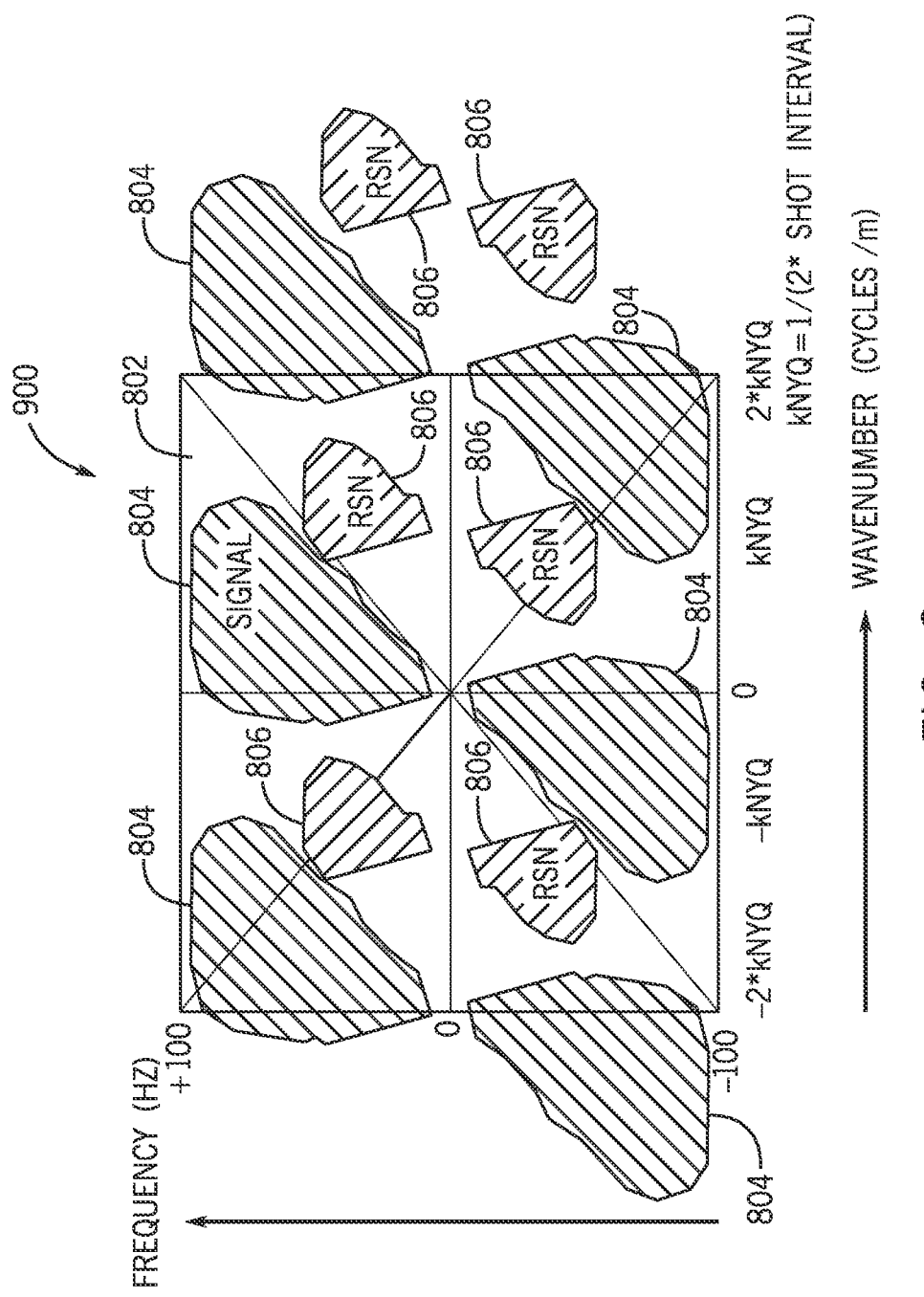
FIGS. 9 and 11 are illustrations of frequency-wavenumber representations of seismic data acquired using a source phase sequencing that varies from shot to shot according to example implementations.

This means that the residual shot noise in each deconvolved shot is phase-reversed relative to the residual shot noise in the previous deconvolved shot. The deconvolved shots have the signal, which is substantially the same from one shot to the next, but with the residual shot noise being reversed in phase between one shot and the next. Because of the successive phase reversion, the residual shot noise is heterodyned, or aliased, as depicted in an illustration 900 of FIG. 9. In this manner, referring to FIG. 9, for this example, the signal energy 804, remains inside a signal cone, such as example signal cone 802, with the residual shot noise energy 806 being generally aliased outside of the signal cone 802. This permits, for example, frequency-wavenumber filtering to be applied to remove a significant portion, if not all, of the residual shot noise energy 806.

Figure 10:
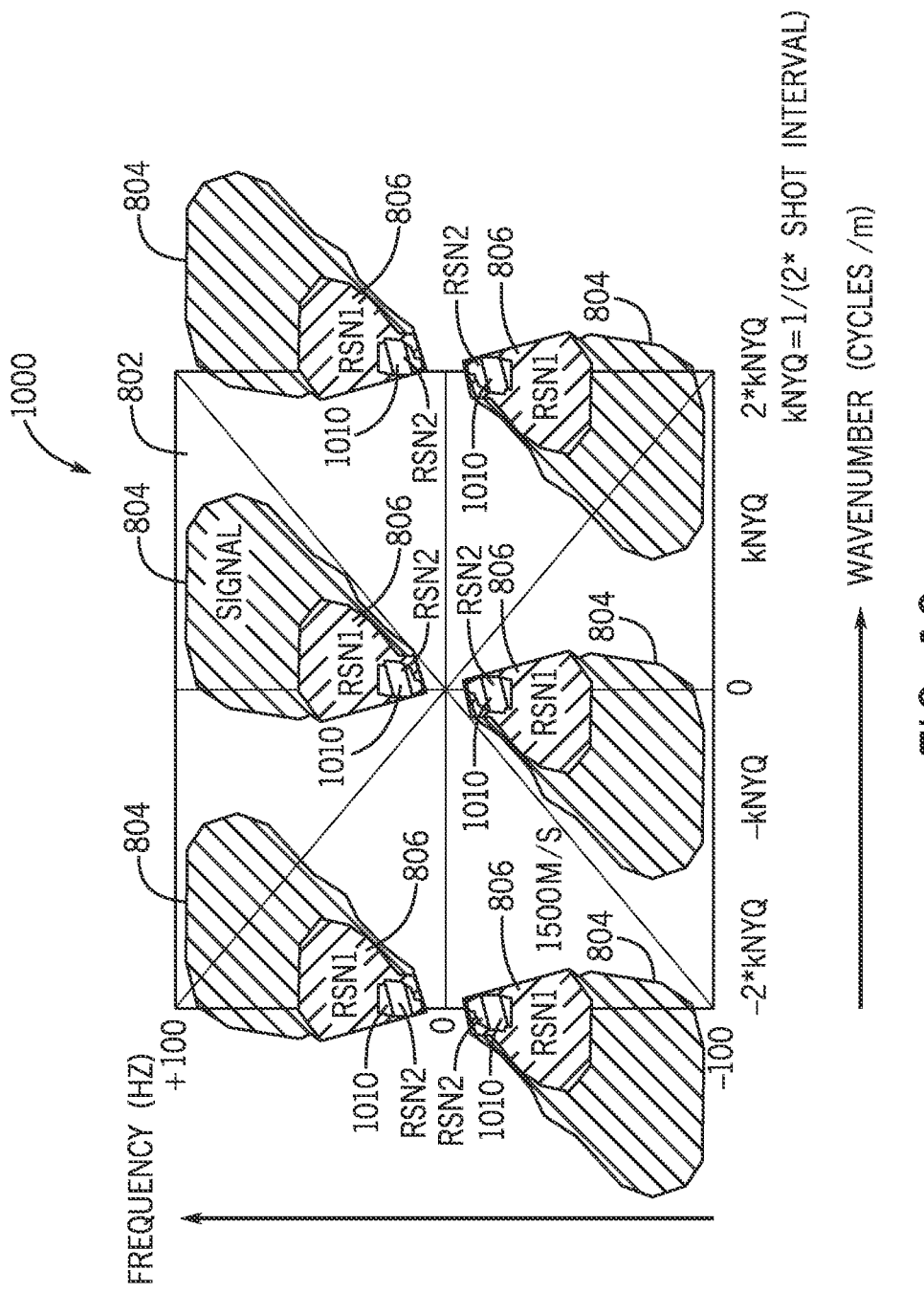
Figure 11:
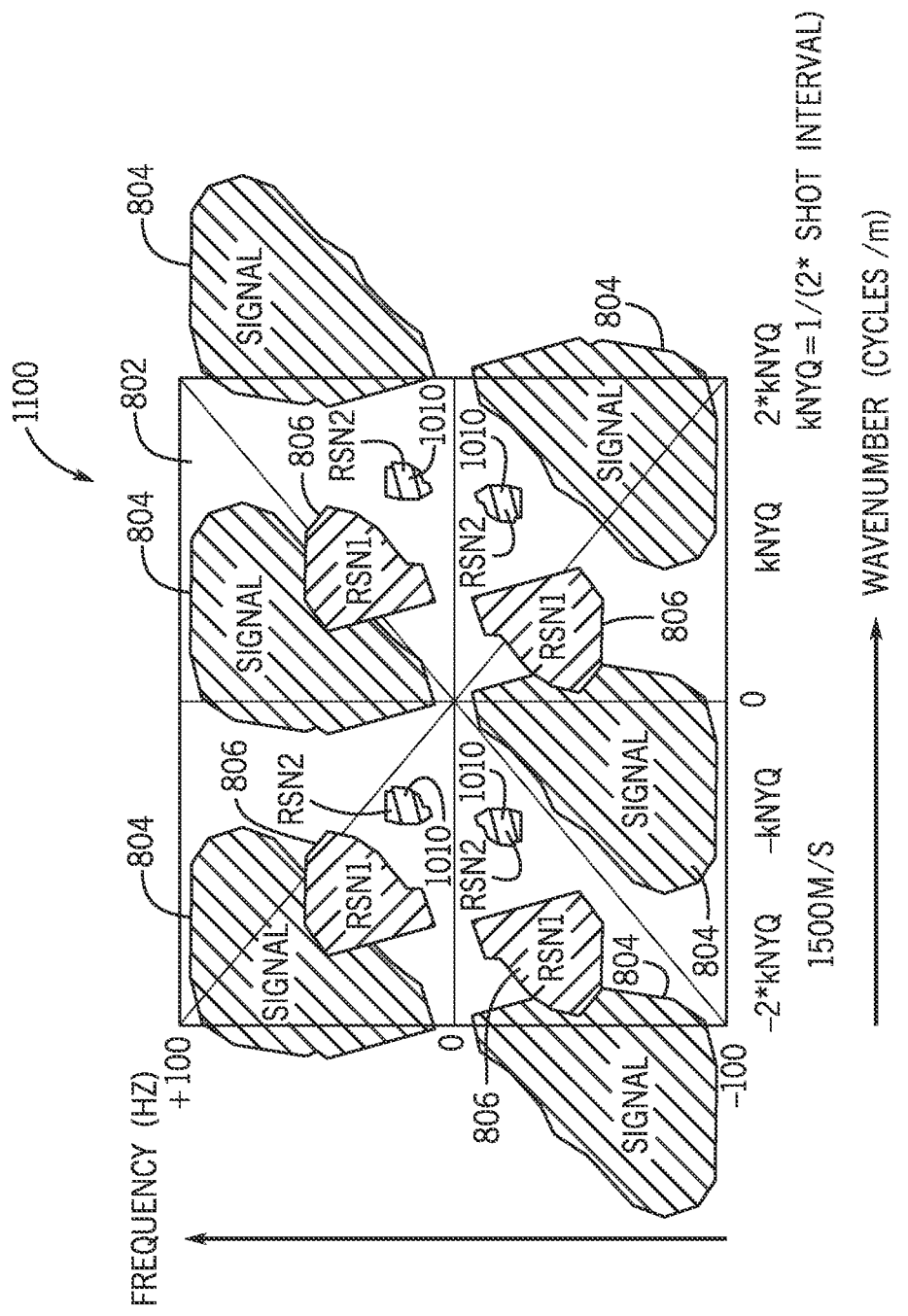

In accordance with further example implementations, the residual shot noise may be removed from the shot before the previous one or, in general, placed in a more optimal position than halfway between the signal cones. For this purpose, a different pattern of phase shifts may be employed. More specifically, as depicted in an illustration 1000 of FIG. 10, the residual shot noise from one shot before (herein called the "RSN2" residual shot noise energy 1010) may be aliased back into the signal cone 802, along with the residual shot noise energy from the immediately preceding shot (herein called the "RSN1" residual shot noise energy 806), if the phases of the shots are not varied. To remove both the RSN1 806 and RSN2 1010 residual shot noise energies, the relative phase shift of the RSN1 residual shot noise energy 806 is set to be 120 degrees, instead of 180 degrees. The shift of RSN2 residual shot noise energy 1010 is then set to be 240 degrees, to heterodyne the RSN1 and RSN2 shot noise energies, as depicted in FIG. 11. In this regard, referring to FIG. 11, an illustration 1100 of the frequency-wavenumber space, the above-described heterodyning moves RSN1 806 and RSN2 1010 residual shot noise energies generally outside of the signal cone 802. This allows the application of frequency-wavenumber filtering for purposes of significantly attenuating both the RSN1 and RSN2 residual shot noises.

In general, it is beneficial if the residual shot noise of the previous shot has a phase shift of θ relative to the previous shot. To accomplish this, the sequence of source phases (called "Ø(n)") may be used, as described by the follow function:

$$\emptyset(n) = 2 \cdot \emptyset(n-1) - \emptyset(n-2) - \theta, \quad \text{Eq. 1}$$

where "n" is the shot index; and θ" represents a pre-selected constant, or fixed value.

For the example above, θ is set equal to 180 degrees, and the sequence may be described as follows:

TABLE 1

| SOURCE PHASE (ø) | RSN1 DECONVOLVED PHASE | DIFFERENCE (Θ) |
|---|---|---|
| 0 | | |
| 90 | 270 | |
| 0 | 90 | 180 |
| 90 | 270 | 180 |
| 0 | 90 | 180 |
| 90 | 270 | 180 |
| 0 | 90 | 180 |
| 90 | 270 | 180 |
| 0 | 90 | 180 |
| 90 | 270 | 180 |
| 0 | 90 | 180 |
| 90 | 270 | 180 |
| 0 | 90 | 180 |
| 90 | 270 | 180 |
| 0 | 90 | 180 |
| 90 | 270 | 180 |
| 0 | 90 | 180 |
| 90 | 270 | 180 |

If a 120 degree shift in the residual shot noise phase is desired at each shot, then the following sequence may be used.

TABLE 2

| SOURCE PHASE (ø) | RSN1 DECONVOLVED PHASE | DIFFERENCE (Θ) |
|---|---|---|
| 0 | | |
| 60 | 300 | |
| 0 | 60 | 120 |
| 180 | 180 | 120 |
| 240 | 300 | 120 |
| 180 | 60 | 120 |
| 0 | 180 | 120 |
| 60 | 300 | 120 |
| 0 | 60 | 120 |
| 180 | 180 | 120 |
| 240 | 300 | 120 |
| 180 | 60 | 120 |
| 0 | 180 | 120 |
| 60 | 180 | 120 |
| 60 | 300 | 120 |
| 0 | 60 | 120 |
| 180 | 180 | 120 |
| 240 | 300 | 120 |
| 180 | 60 | 120 |
| 0 | 180 | 120 |
| 60 | 300 | 120 |

Other phase shifts may be applied to the residual shot noise, in accordance with further implementations.

Figure 12:
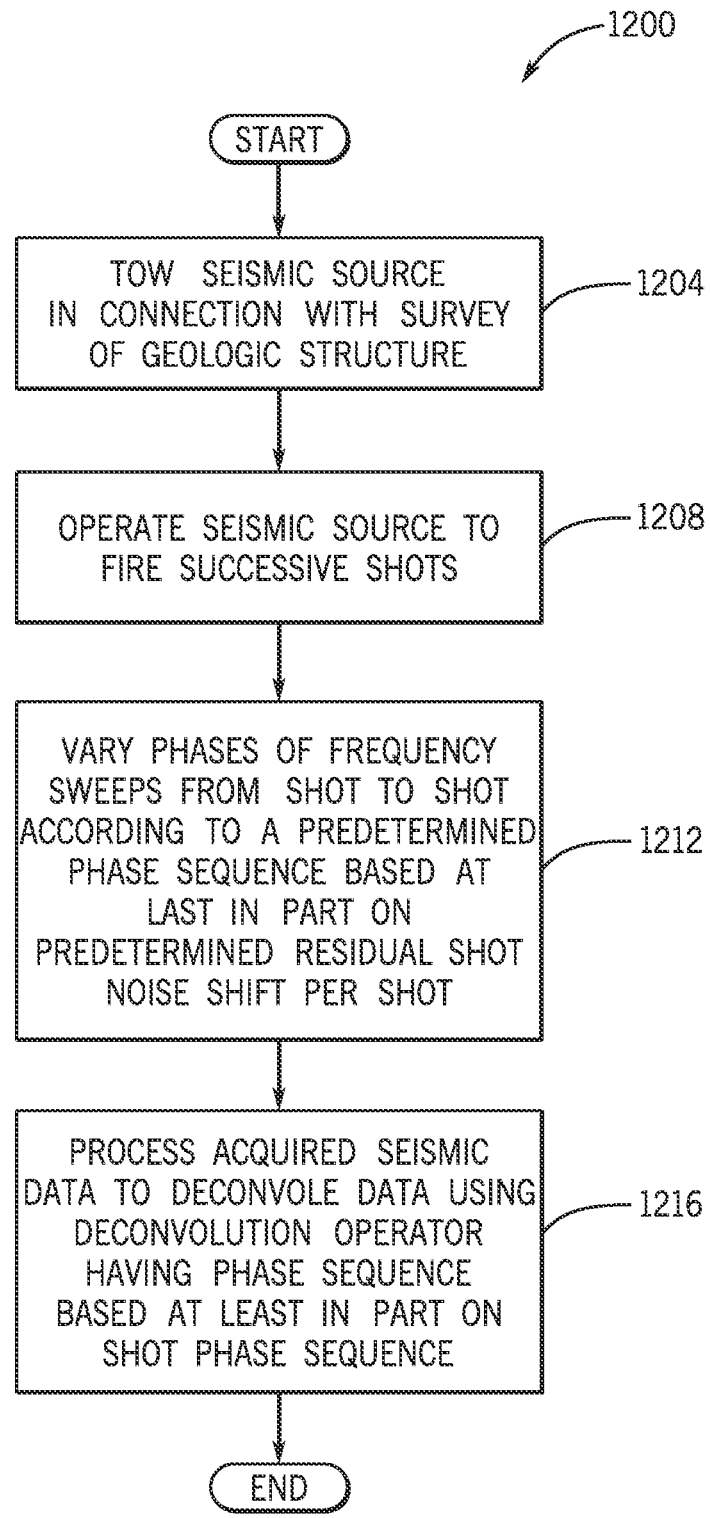
FIG. 12 is a flow diagram depicting a technique to acquire and process seismic data in a manner that attenuates residual shot noise according to an example implementation.

Thus, referring to FIG. 12, in accordance with example implementations, a technique 1200 includes towing (block 1204) a seismic source in connection with a survey of a geologic structure and operating (block 1208) the seismic source to fire successive shots. The technique 1200 includes varying the phases of frequency sweeps from shot to shot according to a predetermined phase sequence based at least in part on a predetermined residual shot noise shift per shot, pursuant to block 1212. Pursuant to block 1216, the acquired seismic data may then be processed to deconvolve the data using a deconvolution operator having a phase sequence based at least in part on the shot phase sequence.

The above discussion assumes that the vibrator may be controlled to emit a sweep with a defined phase shift φ. The frequency sweep may be controlled via a pilot sweep (called "S(t)"), which may, in accordance with example implementaitons, be represented as follows:

$$S(t) = \sin \left[ 2\pi \int_0^t f(t') dt' \right]. \quad \text{Eq. 2}$$

To generate a pilot sweep S(t) with a phase shift φ, the pilot sweep S(t) may be represented as follows:

$$S(t) = \sin \left[ \phi + 2\pi \int_0^t f(t') dt' \right]. \quad \text{Eq. 3}$$

For the example implementation discussed above in which the phase shift φ alternates between 0 and 90 degrees, the sweeps may alternate between sine and cosine sweeps of the same function, as described below:

$$S_{odd}(t) = \sin \left[ 2\pi \int_0^t f(t') dt' \right], \text{ and tm Eq. 4}$$

$$S_{even}(t) = \cos \left[ 2\pi \int_0^t f(t') dt' \right]. \quad \text{Eq. 5}$$

Figure 13:
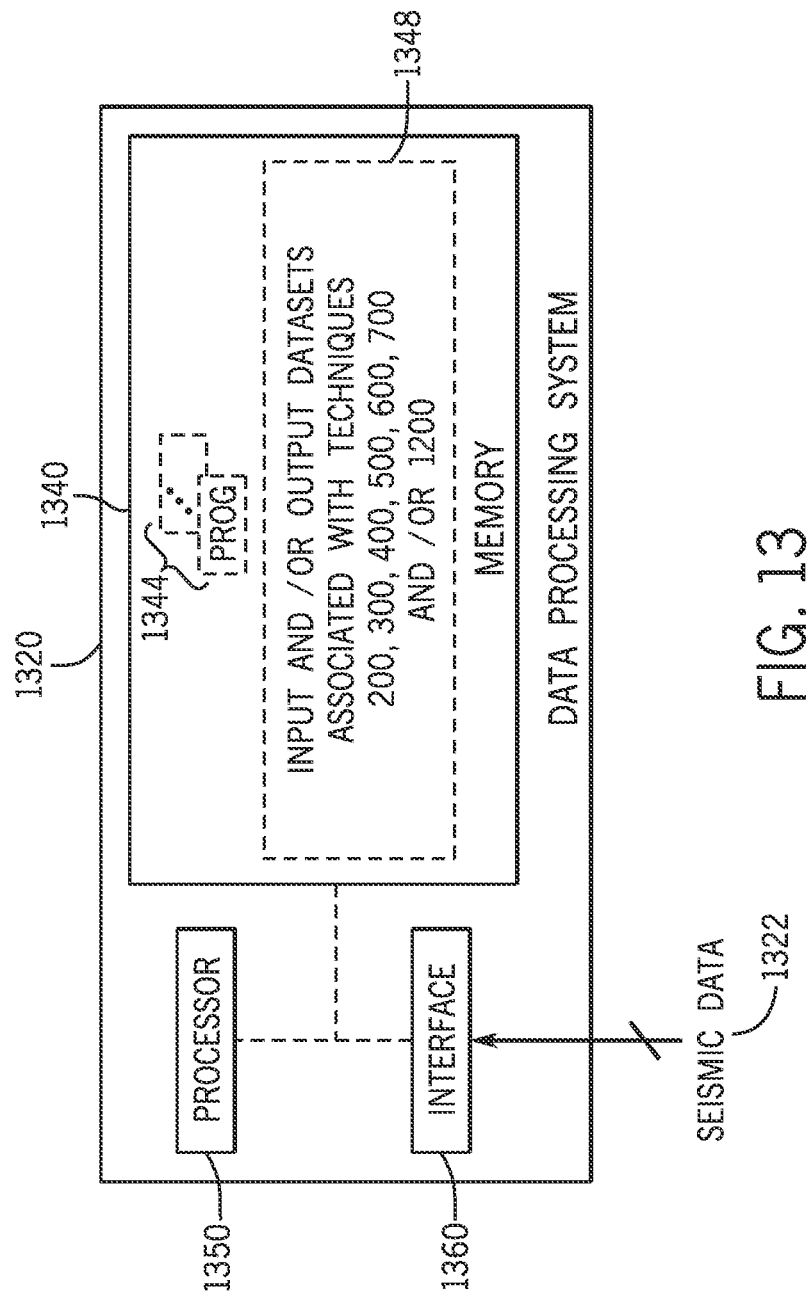
FIG. 13 is a schematic diagram of a data processing system according to an example implementation.

Referring to FIG. 13, in accordance with some implementations, a data processing system 1320 (a computer, for example), may contain a processor 1350 for purposes of processing the acquired seismic data. The data processing system 1320 is an actual machine made from actual hardware and actual machine executable instructions (or "software"). In accordance with example implementations, the processor 1350 may be formed from one or more microprocessors and/or microprocessor processing cores. In general, the processor 1350 is a general purpose processor, and may be formed from, depending on the particular implementation, one or multiple central processing units (CPUs), or application specific integrated circuits (ASICs), field programmable gate arrays (FPGAs), programmable logic devices (PLDs), or other appropriate devices, as can be appreciated by the skilled artisan. As a non-limiting example, the processor 1350 may be part of the circuitry 23 (see FIG. 1A) on the vessel 20, or may be disposed at a remote site. Moreover, the data processing system 1320 may be a distributed processing system, in accordance with further implementations.

As depicted in FIG. 13, the processor 1350 may be coupled to a communication interface 1360 for purposes of receiving data 1322, which represents data acquired by seismic sensors and generally represents data resulting from the interaction of source energy with a geologic structure, where the source energy is the result of the application of the phase-shifted sweep functions, as described herein. As examples, the communication interface 1360 may be a Universal Serial Bus (USB) interface, a network interface, a removable media interface (a flash card, CD-ROM interface, etc.) or a magnetic storage interface (an Intelligent Device Electronics (IDE)-compliant interface or Small Computer System Interface (SCSI)-compliant interface, as non-limiting examples). Thus, the communication interface 1360 may take on numerous forms, depending on the particular implementation.

In accordance with some implementations, the processor 1350 is coupled to a memory 1340 that stores program instructions 1344, which when executed by the processor 1350, may cause the processor 1350 to perform various tasks of one or more of the techniques that are disclosed herein, such as the techniques 200, 300, 400, 500, 600, 700 and/or 1200, as examples.

As a non-limiting example, in accordance with some implementations, the instructions 1344, when executed by the processor 1350, may cause the processor 1350 to process information derived from the data received by the interface 1360 in an application (an image construction application or a deghosting application, as examples), which relies on attenuation of noise present in the energy sensed by the sensors.

In general, the memory 1340 is a non-transitory storage medium and may take on numerous forms, such as (as non-limiting examples) semiconductor storage, magnetic storage, optical storage, phase change memory storage, capacitor-based storage, and so forth, depending on the particular implementation. Moreover, the memory 1340 may be formed from more than one of these non-transitory storage mediums, in accordance with further implementations. When executing one or more of the program instructions 1344, the processor 1350 may store preliminary, intermediate and/or final results obtained via the execution of the instructions 1344 as data 1348 that may be stored in the memory 1340.

It is noted that the data processing system 1320 is merely an example of one out of many possible architectures, in accordance with the techniques and systems that are disclosed herein. Moreover, the data processing system 1320 is represented in a simplified form, as the processing system 1320 may have various other components (a display to display initial, intermediate and/or final results of the system's processing, as non-limiting examples), as can be appreciated by the skilled artisan.

Other variations are contemplated, which are within the scope of the appended claims. For example, the systems and techniques that are disclosed herein may be applied to energy measurement acquisitions systems, other than seismic acquisition systems. For example, the techniques and systems that are disclosed herein may be applied to non-seismic-based geophysical survey systems, as electromagnetic or magnetotelluric-based acquisition systems, in accordance with further implementations. The techniques and systems that are disclosed herein may also be applied to energy measurement acquisition systems, other than systems that are used to explore geologic regions. Thus, although the surveyed target structure of interest described herein is a geologic structure, the target structure may be a non-geologic structure (human tissue, a surface structure, and so forth), in accordance with further implementations.

While a limited number of examples have been disclosed herein, those skilled in the art, having the benefit of this disclosure, will appreciate numerous modifications and variations therefrom. It is intended that the appended claims cover all such modifications and variations.

What is claimed is:

1. A method comprising:
towing a plurality of seismic sources in connection with a survey of a geologic structure;
operating the plurality of seismic sources to fire respective shots at substantially the same time, wherein each shot is associated with a frequency sweep; and
varying phases of the frequency sweeps among the plurality of seismic sources from shot to shot according to a predetermined phase sequence such that shots fired by respective seismic sources at substantially the same time are associated with frequency sweeps having different phases to allow noise in an energy sensed by seismic sensors to be source separated.

2. The method of claim 1, wherein varying the phases comprises, for each seismic source of the plurality of seismic sources, varying phases of the frequency sweeps of the shots fired by the seismic source from shot to shot.

3. The method of claim 1, wherein varying the phases comprises varying the phases to allow the energy to be separated up to a predefined frequency threshold.

4. The method of claim 1, wherein:
varying the phases comprises varying the phases to allow residual shot noise associated with a given seismic source of the plurality of seismic sources to be attenuated.

5. The method of claim 4, wherein varying the phases comprises varying the phases based at least in part on a predetermined residual shot noise shift per shot.

6. The method of claim 4, wherein varying the phases comprises varying the phases according to a function $\varnothing(n) = 2 \cdot \varnothing(n-1) - \varnothing(n-2) - \theta$, where $\varnothing(n)$ represents a phase of shot n and $\theta$ is a fixed phase shift.

7. The method of claim 6, wherein $\theta$ is near or at 180 degrees.

8. The method of claim 4, wherein varying the phases comprises regulating the frequency sweeps such that the frequency sweeps alternate between a sine and a cosine of a given phase function.

9. The method of claim 1, wherein varying the phases comprises varying the phases according to a repeating pattern.

10. A method comprising:
receiving data acquired by sensors, the data representing energy sensed by the sensors resulting from source energy from a plurality of one seismic sources interacting with a structure, wherein the plurality of seismic sources are operated to fire shots, the plurality of seismic sources fire respective shots at substantially the same time, each shot is associated with a frequency sweep, and phases of the frequency sweeps varying among the plurality of seismic sources from shot to shot according to a predetermined phase sequence such that shots fired by respective seismic sources at substantially the same time have different phases; and processing information derived from the data by a processor-based machine in an application to source separate the energy sensed by the sensors.

11. The method of claim 10, further comprising:
performing frequency-wavenumber filtering of the data to generate the information derived from the data.

12. The method of claim 10, wherein the processing comprises:
performing deghosting or constructing an image based on the data.

13. The method of claim 10, further comprising:
processing the information in an application that relies on attenuation of residual shot noise.

14. An apparatus comprising:
an interface to receive data acquired by sensors, the data representing energy sensed by the sensors resulting from source energy from a plurality of seismic sources interacting with a structure, wherein the plurality of seismic sources are operated to fire shots, the plurality of seismic sources fire respective shots at substantially the same time, each shot being associated with a frequency sweep, and phases of the frequency sweeps varying among the plurality of seismic sources from shot to shot according to a predetermined phase sequence such that shots fired by respective seismic sources at substantially the same time are associated with different phases; and a processor to process information derived from the data by a processor-based machine in an application to source separate the energy sensed by the sensors.

15. The apparatus of claim 14, wherein:
the processor is adapted to process the information in an application that relies on attenuation of residual shot noise.

16. An article comprising a non-transitory computer readable storage medium storing instructions that when executed by a computer cause the computer to:
receive data acquired by sensors, the data representing energy sensed by the sensors resulting from source energy from a plurality of seismic sources interacting with a structure, wherein the plurality of seismic sources are operated to fire shots, the plurality of seismic sources fire respective shots at substantially the same time, each shot being associated with a frequency sweep, and phases of the frequency sweeps varying among the plurality of seismic sources from shot to shot according to a predetermined phase sequence such that shots fired by respective seismic sources at substantially the same time are associated with different phases; and process information derived from the data in an application to source separate the energy sensed by the sensors.

* * * * *